United States Patent [19]
Beller et al.

[11] Patent Number: 5,573,403
[45] Date of Patent: Nov. 12, 1996

[54] AUDIO FREQUENCY CONVERTER FOR AUDIO-PHONATORY TRAINING

[76] Inventors: Isi Beller, 6, rue de Savoie, F 75006 Paris; Boris Fradin, 7, Chemin du Croison, F 77123 Noisy sur Ecole, both of France

[21] Appl. No.: 256,703
[22] PCT Filed: Jan. 20, 1993
[86] PCT No.: PCT/FR93/00056
  § 371 Date: Jul. 21, 1994
  § 102(e) Date: Jul. 21, 1994
[87] PCT Pub. No.: WO93/14482
  PCT Pub. Date: Jul. 22, 1993

[30] Foreign Application Priority Data
Jan. 21, 1992 [FR] France ................... 92 00603

[51] Int. Cl.⁶ ........................................ H04R 3/12
[52] U.S. Cl. .................... 434/185; 434/156; 381/150; 395/2.09
[58] Field of Search .................... 434/156, 185, 434/307 R, 308, 319, 365, 320; 379/430; 364/419.01, 419.2; 395/2, 2.79; 381/150; 310/160; 340/384.1

[56] References Cited

U.S. PATENT DOCUMENTS

| | | | |
|---|---|---|---|
| 3,713,228 | 1/1973 | Mason et al. | 434/185 |
| 3,934,092 | 1/1976 | Csicsatka | 381/6 |
| 4,063,195 | 12/1977 | Abrams et al. | 359/330 |
| 4,206,417 | 6/1980 | Poulo | 330/107 |
| 4,615,680 | 10/1986 | Tomatis | 434/157 |
| 4,685,448 | 8/1987 | Shames et al. | 381/151 X |
| 4,708,657 | 11/1987 | Beller et al. | 434/185 |
| 4,895,519 | 1/1990 | Beller et al. | 434/185 |

*Primary Examiner*—Joe Cheng
*Attorney, Agent, or Firm*—Foley & Lardner

[57] ABSTRACT

An audio frequency converter apparatus which includes an input amplifier, first threshold sensor, connected to an output of the input amplifier, for cutting off a voltage supplied by the input amplifier at a threshold, after rectification, and second threshold sensor, connected to the output of the input amplifier, for adding at a threshold the voltage supplied by the input amplifier after rectification. The second threshold sensor has a time constant which is at least equal to that of the first threshold sensor. A voltage controlled oscillator is connected to the output of the first threshold sensor to provide an oscillating output having a frequency that decreases with an increase in she output of the first threshold sensor. A modulator having first and second inputs respectively connected to the outputs of the second threshold sensor and the voltage controlled oscillator is provided to supply the parametric signal oscillating with the frequency of the first input to the modulator with an envelope amplitude that increases with an increase in the second input. A variator is provided for varying at least one of the characteristics of a group formed by the amplitude and the frequency of the parametric signal, as a function of at least one of the characteristics of the group formed by the logarithm of the amplitude and of the frequency of the audio frequency signal.

14 Claims, 6 Drawing Sheets

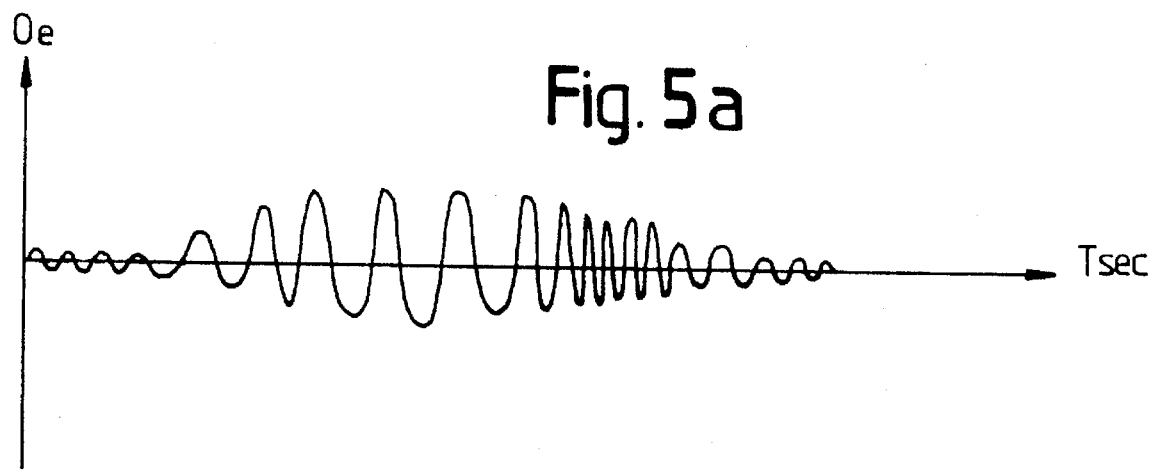
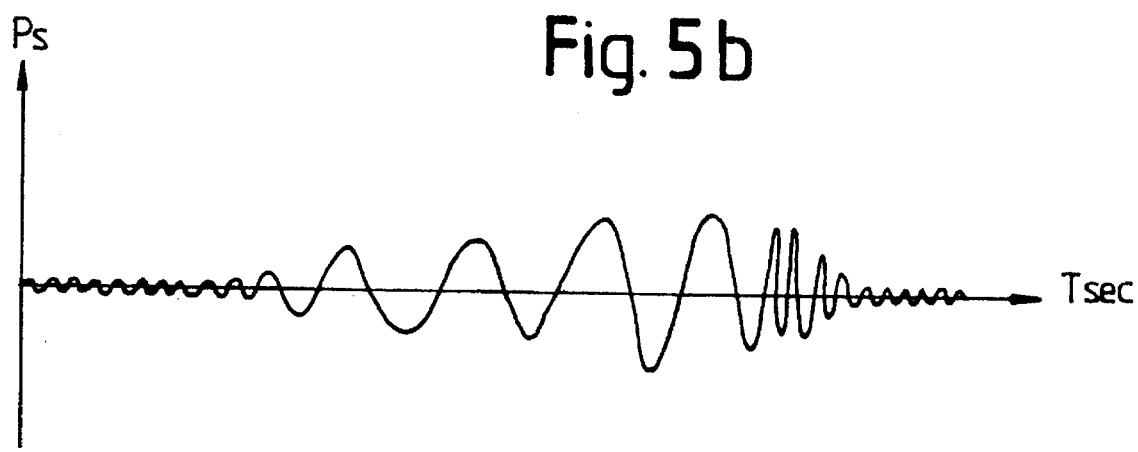
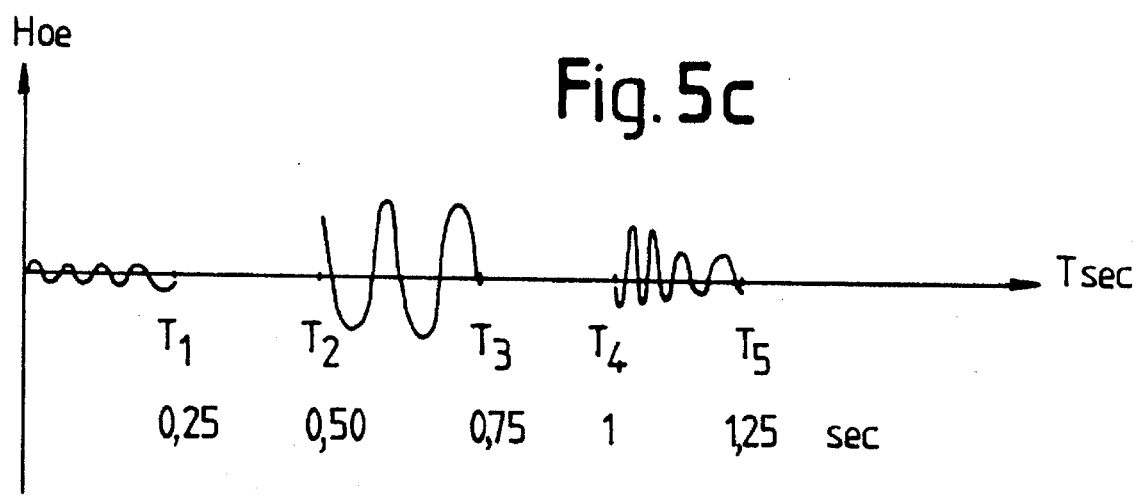

AUDIO FREQUENCY CONVERTER FOR AUDIO-PHONATORY TRAINING

This invention relates to an installation for audio-phonatory training, particularly for treatment, by auditory means, of audio-phonatory problems presented by some people, generally speaking, by small children.

Installations for treating patients with audio-phonatory problems are already known. In particular, the applicant for French Patent No. 84 12019 published under number 2 568 437, proposes an installation comprising a natural audio frequency converter for converting a parametric signal, intended to be applied to a person to be treated, starting from an audio frequency signal fed to the input which is passed through the intermediatory of an electroacoustic transducer. More precisely, the audio frequency converter apparatus comprises:

amplification means for the input;

first threshold sensor means connected to the output of the input amplification means which cuts off the voltage supplied by the latter at a threshold, after rectification;

second threshold sensor means likewise connected to the output of the amplification means which adds, at a threshold, the voltage supplied by the latter, after rectification, and has a time constant which is at least equal to that of the first sensor means;

voltage controlled oscillator means, connected to the output of the first threshold sensor means; and modulator means, the inputs of which are connected respectively to the outputs of the first and second threshold sensor means and the oscillator means, and of which the output supplies the said parametric signal.

The present invention provides an improvement on the prior art installation which has not given complete satisfaction.

The present invention relates to an audio frequency converter apparatus of the aforementioned type.

According to a general characteristic of the invention, at least one of the characteristics of the group formed by the amplitude and the frequency of the parametric signal varies as a function of at least one of the characteristics of the group formed by the logarithm of the amplitude and the frequency of the audio frequency signal, which allows a parametric signal which is pleasant for the person being treated to listen to be obtained.

According to a preferred embodiment of the present invention, at least one of the first and second threshold sensor means comprises at least one diode and resistor network to vary the amplitude and/or the frequency of the parametric signal as a function of the logarithm of the amplitude and/or the frequency of the audio frequency signal.

With a view to providing a parametric signal which is efficient from a clinical point of view, and which is not too disagreeable to listen to by the person being treated, the time constant or constants of the first and/or second threshold sensors may be an increasing function of the frequency of the audio frequency signals.

According to one aspect of the invention, the parametric signal is a compound signal comprising a fundamental frequency and a plurality of harmonic frequencies and the modulator means is provided with filtering means adapted to at least partially filter the harmonic frequencies.

In practice, the filter means comprises a low pass type filter connected to the output of the modulator means.

According to a variation of the present invention, the oscillator means emits a rectangular signal having a form factor in the order of 0.5 which allows the paired harmonic frequencies of the parametric signal to be removed.

When it is desirable, for certain cases of re-education, the audio frequency signal is chopped at a chosen rate with silences of a predetermined length.

Advantageously, the time constant or constants of the first and/or second threshold sensors may be adjusted so that they remain below a predetermined value, that value being representative of a rhythmical sequence taking into consideration the phonemes comprising the audio frequency signal.

The invention also provides an installation for treating patients having audio phonatory problems comprising an audio frequency converter apparatus in accordance with the characteristics referred to above.

In practice, the installation comprises, at the input to the converter, an input switch adapted to be connected to a sound reproducing unit and/or one or more microphones, and at the output of the converter, an output switch adapted to be connected to a sound reproduction unit and/or to a sound recorder.

In one variation, the output switch receives in addition to the parametric signal coming from the converter, the audio frequency signal which is chopped at a chosen rate with silences of a predetermined length.

The invention also aims to provide a method of treating patients having audio phonatory problems using the installation referred to above.

According to an essential characteristic of the invention, the method comprises the following steps:

a) Injecting into each ear of the patient to be treated a mixture of comprehensible sounds and of parametric sounds supplied by the installation; the comprehensible sounds being susceptible to being chopped at a chosen rate with silences of a predetermined length;

b) amplifying or recording the audio signals emitted by the patient to be treated in response to this injection;

c) applying the thus amplified or recorded audio frequency signal to the installation to convert it into a parametric signal;

d) again injecting into each ear of the person to be treated a mixture formed from comprehensible sounds and the converted parametric signals.

Advantageously, the installation may be provided with mixer-summation means comprising a first input receiving the audio frequency signal previously stored on a sound carrier; a second input receiving the transformed parametric signal of the audio frequency signal thus stored; a third input receiving the audio frequency signal coming from a microphone intended for use by the patient to be treated; a fourth input receiving the parametric transformation of the signal coming from the microphone of the patient being treated; a fifth input receiving the audio frequency signal coming from a microphone intended for use by the user of the installation (for example a doctor); a sixth input receiving the parametric transformation of the audio frequency signal coming from the microphone of the user.

Preferably, two independent mixers-summators are used, one for each ear of the patient to be treated.

BRIEF DESCRIPTION OF THE DRAWINGS

Other characteristics and advantages of the invention will become apparent from the following detailed description, and the attached drawings, of which:

FIGS. 5a to 5c are chronograms illustrating the working of the installation described with reference to FIG. 4.

DETAILED DESCRIPTION OF THE INVENTION

Figure 1:
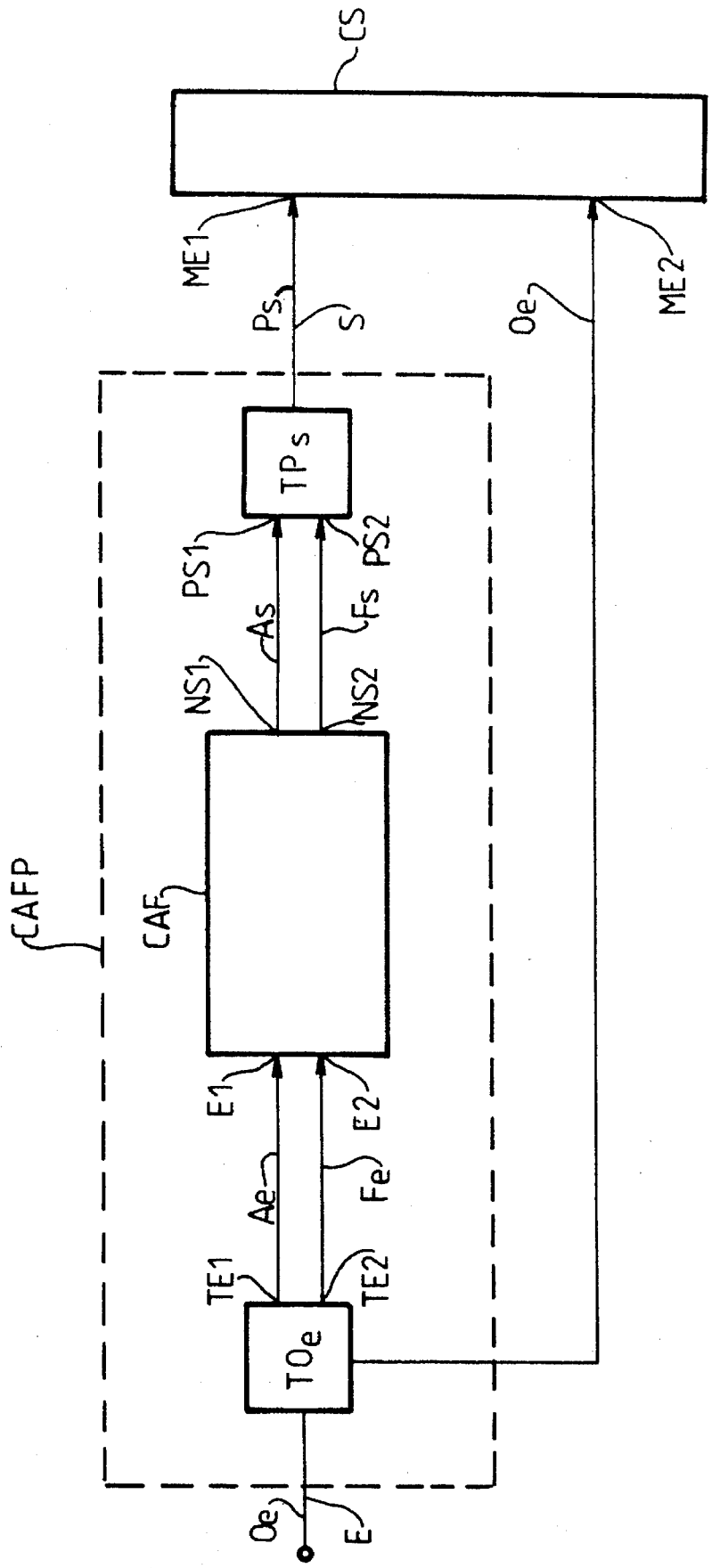
FIG. 1 is a diagram illustrating the principle of the installation in accordance with the invention.

FIG. 1 shows, under the general reference CAFP, a parametric converter. In the present case, this converter is an audio frequency converter. It comprises an input E and an output S.

The input E receives an audio frequency signal Oe carrying natural sounds, that is to say a verbal, vocal or musical audio frequency signal, which may be produced just as well by a normal person as by the patient to be treated or by a musical source.

The natural signal is applied to a stage TOe, from which the outputs TE1 and TE2 are applied respectively to the inputs E1 and E2 of an audio frequency converter apparatus CAF.

The output TE1 provides a signal Ae representing the amplitude of the natural signal whilst the output TE2 provides a signal Fe representing the frequency of the natural signal.

The audio frequency converter CAF which will be described in more detail below comprises two outputs NS1 and NS2 connected respectively to inputs PS1 and PS2 of an amplifier stage TPs which provides, at its output S, the parametric signal Ps.

It should be noted that the output NS1 provides a signal As representing the amplitude of the parametric signal whilst the output NS2 provides a signal Fs representing the frequency of the parametric signal.

At the output, the installation is provided with an output switch or adder CS receiving at its first input ME1 the parametric signal Ps and at its second input MS2 the natural signal Oe.

The applicant has noted that by varying the amplitude As and/or the frequency Fs of the parametric signal Ps as a function of the amplitude Ae and/or the frequency Fe of the audio frequency signal Oe, the parametric signal obtained at the output S possesses properties which allow the installation described in the previously mentioned patent to be improved.

More precisely, the applicant has noticed that in applying a parametric signal according to the equations shown below in respect of its frequency Fs and its amplitude As, the parametric signal is more pleasant to listen to by the person to be treated and produces better re-education results which will be described in more detail below using such a parametric signal.

$$As = K2(1-L1\ Fe)(1+K4\ Ae) \quad (1)$$

$$Fs = (1-Q1\ Fe)\ Q2 + Q0 + Q3\ Ae \quad (2)$$

More precisely, the applicant has noticed that in varying the amplitude As and/or the frequency Fs of the parametric signal Ps as a function of the logarithm of the amplitude Ae and/or the frequency Fe of the audio frequency signal Oe, the parametric signal Ps is even more pleasant to listen to by the person being treated.

A person skilled in the art will understand that the person to be treated experiences a pleasant sensation when hearing a parametric signal modulated in this way in so far as the sensibility of the human ear is equally a logarithmic function of the amplitude and/or the frequency of the audio signal.

A person skilled in the art will also understand that the variation of the amplitude As and/or the frequency Fs of the parametric signal as a function of the amplitude Ae and/or the frequency Fe of the audio frequency signal can be obtained by digital or analogue means.

We will now refer to FIG. 2 which shows schematically an analogue type embodiment of the converter described with reference to FIG. 1.

The natural input signal Oe is applied to the input of an amplification stage Ap having a wide frequency band, the output 12 of which is defined by a level controlling device provided here by a potentiometer R8.

It should be noted that the input signal Oe may come from a sound carrier such as a cassette (here by the input EK through a resistor R2) or by the intermediary of a microphone (here by input EC through a resistor R1); one end of resistor R1 and one end of resistor R2 are connected to a common node 2.

The amplifier stage AP is based on a transistor T1 arranged according to the common emitter type. The input amplifier stage AP amplifies the voltage and the power of the natural signal Oe. The slide 12 of the potentiometer R8 is connected to a first threshold sensor referenced DTS1. One end 14 of the potentiometer R8 is connected to a second threshold sensor referenced DTS2. The other end 16 of the potentiometer R8 is connected to the positive pole 8 of the supply filtered by the resistor R7 and the capacitor C2.

The emitter of the transistor T1 is connected to ground through the resistor R5. The person skilled in the art will understand that the ohmic value of the resistor R5 constitutes the value of the counter-reaction. The collector of the transistor T1 is supplied through resistors R7 and R4 which are arranged in series. The resistor R3 polerises the base of the transistor T1 at the node 4.

The extremity 16 of the potentiometer R8 is connected to a node 8, which is common with a plate of capacitor C2 at one of the ends of the resistor R4 and at one end of the resistor R7. The other plate of the capacitor C2 is connected to earth. The base of the transistor 1 receives the input signal Oe through a capacitor C1. One plate of the capacitor C1 is connected to a node 4 which receives one of the ends of the resistor R3 arranged between the base and the collector of the transistor T1, whilst the other plate of the capacitor C1 is connected to node 2. One end of the resistor R3 and one end of the resistor R4 is connected to a common node 6, connected to the collector or the transistor T1.

A person skilled in the art will understand that the arrangement of amplifier AP allows the power and the voltage of the natural signal Oe to be amplified.

The threshold sensor DTS1 comprises, looking from its input 12, a capacitor C3, the other plate of which is connected firstly to the cathode of a diode D1, and secondly to the anode of a diode D2. The cathode of the diode D2 leads to the slider of a potentiometer R12, receiving at one of its terminals a positive reference voltage whilst the other of its terminals is connected to earth through the resistor R11.

The cathode of the diode D2 is also connected to the plate of a capacitor C6 of which the other plate is connected to earth. The cathode of the diode D2 is also connected to the plate of a capacitor C4 the other plate of which leads to the anode of the diode D1. A resistor R9 is arranged in parallel with the capacitor C4. The anode of the diode D1 is also connected to one end of a resistor R10 the other end of which is connected to the plate of a capacitor C5 of which the other plate is connected to the pointer of the potentiometer R12.

The person skilled in the art will understand that the resistors R9 and R10 provide with the capacitors C3, C4 and C5 the time constants Q0 to Q3 of the equation shown in the attached appendix. The person skilled in the art will also understand that the resistor R9 contributes to the constant C1. In addition, the capacitor C6 is a capacitor having a far greater value than the capacitors C3 and C5 and serves only to eliminate all alternating components at the slider R12.

The common point 20 of the resistor R10 and the capacitor C5 define the intermediate output of the threshold sensor DST1. This output 20 is applied to a resistor diode network which permits the output signal 20 to be varied according to a logarithmic function according to the invention.

More precisely, the intermediate output 20 is connected at one end to a resistor R13 the other end of which leads to the cathode of a diode D3. The anode of the diode D3 is connected to the slider of a potentiometer R15, one end of which is connected to an end of a resistor R16 which receives a positive reference voltage at its other end and the other end of which is connected to the end of a resistor R14 connected to ground. The common point 22 of the resistor R13 and the diode D3 is connected to the base of a transistor T2 arranged according to the DARLINGTON type arrangement with transistor T3. The collectors of the transistors T2 and T3 are connected to a positive reference voltage. The emitter of the transistor T3 is connected to one end of a resistor R17 connected to ground. The common point 24 of the resistor R17 and the transistor T3 is connected to one end of a resistor R18 the other end of which is connected to a plate of a capacitor C7 connected to ground. The resistor R18 and the capacitor C7 form a low pass filter intended to eliminate high frequency interference voltages. The common point 26 of the resistor R18 and the capacitor C7 defines the output of the threshold sensor DST1, which is applied to the frequency control of an oscillator VCO.

The second threshold sensor DTS2 has a structure which is substantially similar to that of the threshold sensor DTS1. The end 14 of the potentiometer R8 is connected through the intermediatory of a capacitor C8 to the anode of a diode D4 and to the cathode of a diode D5. The arrangement of the diodes D4 and D5 is of inverse polarity to that of the diodes D1 and D2.

The anode of the diode D5 is connected to the pointer of a potentiometer R20 which receives a positive reference voltage at its terminals. The cathode of the diode D4 is connected to the plate of a capacitor C9 the other plate of which is connected to the pointer of the potentiometer R20. A resistor R19 is arranged in parallel with the capacitor C9. The cathode of the diode D4 is also connected to one end of a resistor R24 the other end of which leads to the plate of a capacitor C10 of which the other plate is connected to the pointer of the potentiometer R20. The common point 30 of the resistor R21 and of the capacitor C10 is connected to one end of a resistor R22 the other end of which is connected to the plate of a capacitor C11 of which the other plate is connected to the pointer of the potentiometer R24. The common point 32 of the diode D5 of the resistor R19 of the capacitor C9 of the capacitor C10 and of the capacitor C11 is connected to the plate of a capacitor C12 the other plate of which is connected to ground. One terminal of the potentiometer R20 is connected to one end of a resistor R23 connected to ground.

The common point 34 of the resistor R22 and of the capacitor C11 is connected to the base of a transistor T4 arranged as an amplifier having a gain given by the ratio R25 over R24. The resistor R24 is connected to a positive reference voltage and forms the load of the emitter of the transistor T4. The resistor R25 is connected to ground and forms the load of the collector of the transistor T4. The voltage at node 36 is thus amplified with respect to that at node 34.

It should be noted that the threshold detector DTS2 receives a rectification in the opposite sense from that of the threshold sensor DTS1 as threshold sensor DTS2 must supply a voltage which increases when the amplitude of the signal Oe increases.

As the amplifying transistor T4 is arranged inversely to the voltage at node 36 decreasing the voltage when it should be increased, a transistor T7 is added; the base of the transistor T7 is connected to node 36, the emitter is connected to ground through a one kilo-ohm resistor R40 and the collector is connected to one terminal of resistor R20 through a one kilo-ohm resistor R41.

The transistor T7 which serves to again inverse the voltage is, for example, of BC558R type.

The person skilled in the art will understand that the resistors R19 to R22 form with the capacitors C9 to C11 the constants K1 to K4 in equations (1) and (2). The capacitor C12 acts in the same way as capacitor C6 to eliminate all alternating components at the node 32.

It should be noted that it is possible to insert at the point 34 a device similar to the elements R13, D3, R14 to R16, if it is desired to give the threshold detector TTS2 a logarithmic characteristic.

The output SVCO of the oscillator arrangement VCO is applied to an input AN1 of a NORTON type operational amplifier through the intermediatory of a network in series comprising a variable resistor R26, a resistor R27 and a capacitor C12. The second input AN2 of the amplifier is connected to one end of a resistor R28 the other end of which is connected to a plate of a capacitor C13 connected to ground. Therefore, the input AN2 does not receive any alternating voltage. The common point 40 of the resistor R28 and of the capacitor C13 is connected to one end of a resistor R29 connected to ground and to one end of a resistor R30, the other end of which is connected to a positive reference voltage.

The common point 40 is also connected to one end of a resistor R31 the other end of which is connected to the input AN1. The Norton amplifier is provided with two linearisation diodes D6 and D7 as is usually the case with this type of amplifier.

A resistor R33 is arranged between the point 36 and the point DTS2.

The gain of the NORTON amplifier is proportional to the current which is input at the said point SDTS2.

The output SBP of the NORTON amplifier is connected to an emitterdyne T5 which forms part of the NORTON amplifier. The load on the emmiterdyne is the resistor R34. The common point 50 of the base of the transistor D5 and of the output SBP of the NORTON amplifier is connected to one end of a resistor R35 the other end of which is connected to ground as well as being connected to one end of a resistor R36 the other end of which is connected to a positive reference voltage.

The emitter of the transistor T5 comprises the output S1 of the modulator which is formed in this way, that is to say, the terminal of the output of the parametric converter. The capacitor T14 only allows the passage of the alternating component of the parametric signal.

In addition, one of the ends of the resistor R26 is connected to a plate of a capacitor C15 the other plate of which is connected to the base of a transistor T6 of which the emitter comprises the second output S2 of the parametric converter. The common point 60 of the output S2 of the converter and of the emitter of the T6 is connected to one end of a resistor R37 connected to ground.

The base of the transistor T6 is connected to the cathode of a diode D8 of which the anode is connected to ground. A resistor R38 is arranged in parallel to the diode D8.

The person skilled in the art will understand that the first sensor DTS1 carries out a sensing or double voltage rectification of the voltage which is defined by the potentiometer R8. Taking into account the sense of the arms of the diode D1 and D2, the sensing is carried out by a value smaller than the threshold fixed by the point 12, that is to say that the output voltage of the first sensor is cut-out of the threshold defined by the cursor 12. The high value capacitor C6 prevents alternating voltage appearing at the terminals of this potentiometer. In addition, the elements of the threshold sensor DTS1 define, for this first threshold sensor, a time constant in the order of 0.05s.

Conversely, the sense of the sensing in the second threshold sensor DTS2 is inverse; when the input voltage is below the threshold, the sensor DTS2 provides an output voltage in the same sense as the threshold defined by the potentiometer R8. The voltage at the terminals of the capacitor C8 is therefore the sum of the threshold voltage and of the rectified value (or representative of this, taking into account certain offsets produced by the diodes, and which also exist in the first sensor). The elements R19, R21, R22, C9, C10, C11 are chosen such that the second sensor DTS2 has a time constant in the order of 0.3s.

Various forms of adjustment are possible with the apparatus and these will be discussed further on. In normal use, the threshold of the first sensor DTS1 (and if necessary the VCO) are adjusted such that the frequency of the oscillator VCO at rest is in the order of the upper limit of the audible spectrum, which can be considered as having been previously determined at 17,000 Hz for example, or as determined in accordance with the patient's responses, analysed in particular by an audiogram. The threshold of the second sensor DTS2 is adjusted such that the amplitude of the output signal of the modulator is small or non-existent when the oscillator is at its rest frequency, that is to say that the voltage rectified by the threshold sensor DTS2 is zero. In this way, a parametric signal is obtained at the outputs S1 and S2, the frequency and/or the amplitude of which vary as a function of the frequency and/or the amplitude of the input signal.

Due to the network of diode D3 and resistors R13, R14, R15 and R16 a signal is also obtained at the outputs S1 and S2, the frequency and/or amplitude of which vary as a function of the logarithm of the frequency and/or of the amplitude of the input signal. As a result the parametric signal which will be injected into the ears of the person to be treated will be more pleasant to listen to insofar as the sensitivity of the ear is also a function of the logarithm of the audio signal applied to the ear.

In one particular embodiment, the diodes D1, D2, D3, D4, D5, D6, D7, D8 are of the 1N 4448 type.

The potentiometer R18 has a value of 47 kilo-ohms, the capacitors C1 to C11 have values respectively of 100 nanofarads, 470 microfarads, 470 nanofarads, 0.47 microfarads, 100 nanofarads, 1000 microfarads, 100 nanofarads, 10 nanofarads, 100 nanofarads, and 100 nanofarads.

In the input amplifier AP, the resistors R1 to R7 have values respectively of 4.7 kilo-ohms, 10 kilo-ohms, 1 mega-ohm, 4.7 kilo-ohms, 68 ohms and 470 ohms. The transistor T1 is of the BC 548 B type. In the first threshold detector DTS1, the resistors R9 to R18 have values respectively of 220 kilo-ohms, 68 kilo-ohms, 10 kilo-ohms/, 10 kilo-ohms, 22 kilo-ohms, 1.5 kilo-ohms, 2.2 kilo-ohms, 3.3 kilo-ohms, 1 kilo ohm and 2.2 kilo-ohms. In the second threshold detector DTS2, the capacitors C8 to C12 have values respectively of 100 nanofarads, 10 nanofarads, 100 nanofarads, 100 nanofarads and 220 microfarads. The resistors R19 and R25 have values respectively of 68 kilo-ohms, 10 kilo-ohm, 100 kilo-ohms, 220 kilo-ohms, 10 kilo-ohms, 1 kilo-ohm and 10 kilo-ohms. The transistors T2 and T3 arranged in a DARLINGTON arrangement are of the BC 548 B type.

The transistor T4 is of the BC 558 B type.

The oscillator VCO may be an integrated circuit of the HEP 4046 B type manufacture by PHILIPS. Its No 9 terminal receives the output of the first threshold detector DTS1. Its No 16 terminal receives the powering voltage. Its No 8 terminal is connected to earth. The control voltage is applied to the input 5. This must be positive for the VCO to work.

The resistor R36 connected to the terminal 11 and the capacitor C16 connected to the terminals 6 and 7 determine the frequency of the oscillator VCO.

When it is desired to obtain a parametric signal which is pleasant to listen to by the person to be treated, it is preferable that the oscillator delivers a rectangular signal having a factor of form of 0.5.

In the oscillator stage, the resistors R38 and R39 have values of 22 kilo-ohms and 6.8 kilo-ohms. The capacitor C16 has a value of 4.7 nanofarads.

In the modulator stage, the NORTON amplifier is of the LM 13 600 type. The resistors, R26 to R38 have values respectively of 470 kilo-ohms, 33 kilo-ohms, 470 ohms, 2.2 kilo-ohms, 2.2 kilo-ohms, 470 ohms, 8.2 kilo-ohms, 4.7 kilo-ohms, 4.7 kilo-ohms, 3.9 kilo-ohms, 10 kilo-ohms, 3.3 kilo-ohms and 18.2 kilo-ohms. The capacitors C12 to C15 have values respectively of 100 nanofarads, 47 microfarads, 479 nanofarads and 2 nanofarads.

Figure 2:
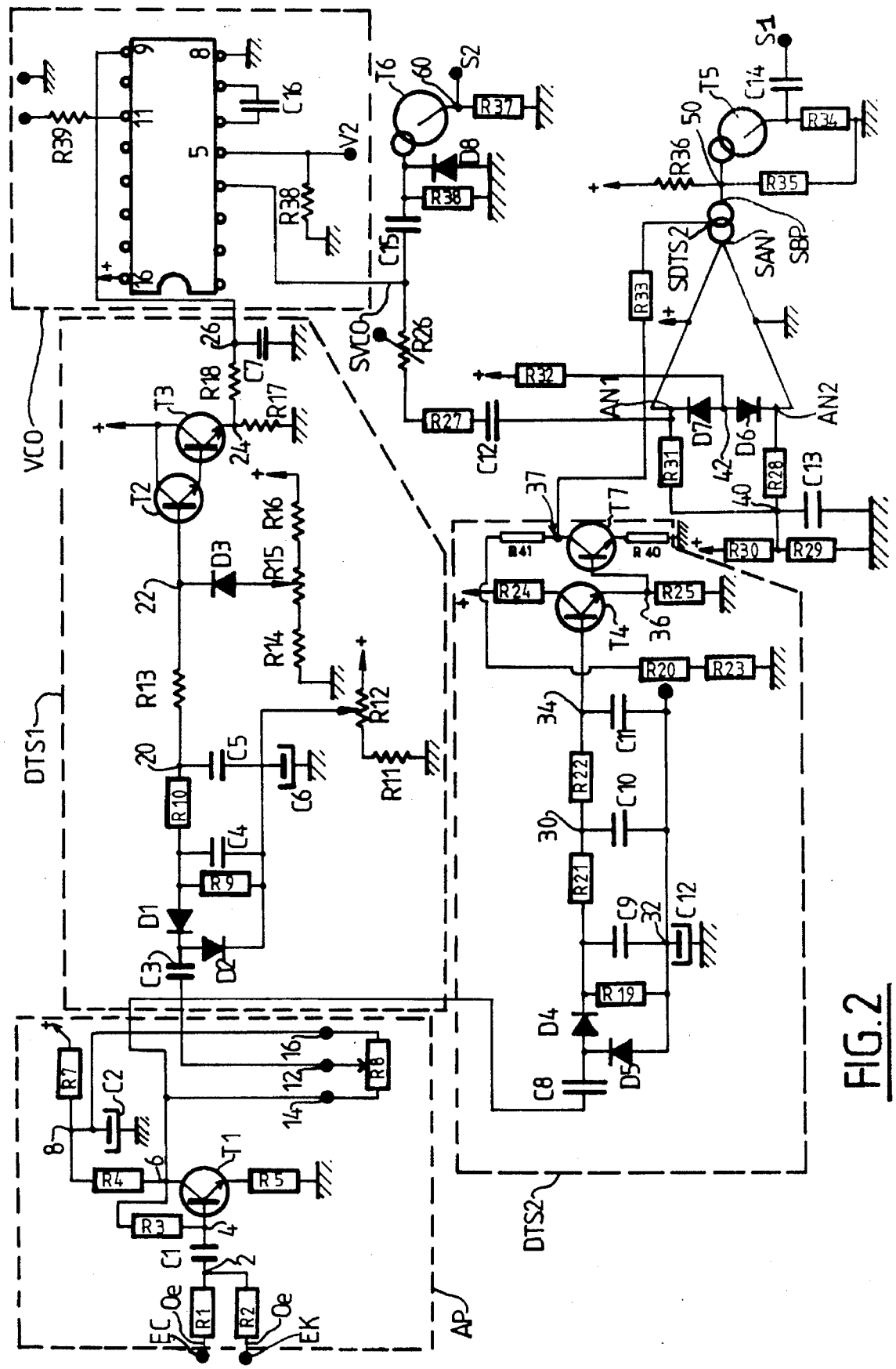
FIG. 2 is a detailed electrical diagram of the audio frequency converter according to the invention.

As shown on FIG. 2 the amplifier stage AP receives a natural signal Oe which may come from a cassette or from a microphone (input EK) and/or from another microphone (input EC).

By adjusting the potentiometer R8, the user adjusts to his convenience the voltage of the input signal Oe amplified at the input of the threshold sensor DTS1. This assumes that the resistors R1 and R2 have values which are chosen in such a way that the signals applied to the inputs EC and ER produce voltages which are substantially of the same value as at the point 2. As the microphones can be activated by people speaking in different manners, it is necessary to adjust the amplifier of each microphone by an amplifier control A.

It is then necessary to adjust the potentiometer R8, then to adjust the input EC, the amplifier control A and finally the input EK.

A disadvantage of further adjustment of the potentiometer R8 is that this results in a correction of the amplifier control A being required.

The applicant has attempted to overcome this disadvantage.

Figure 3:
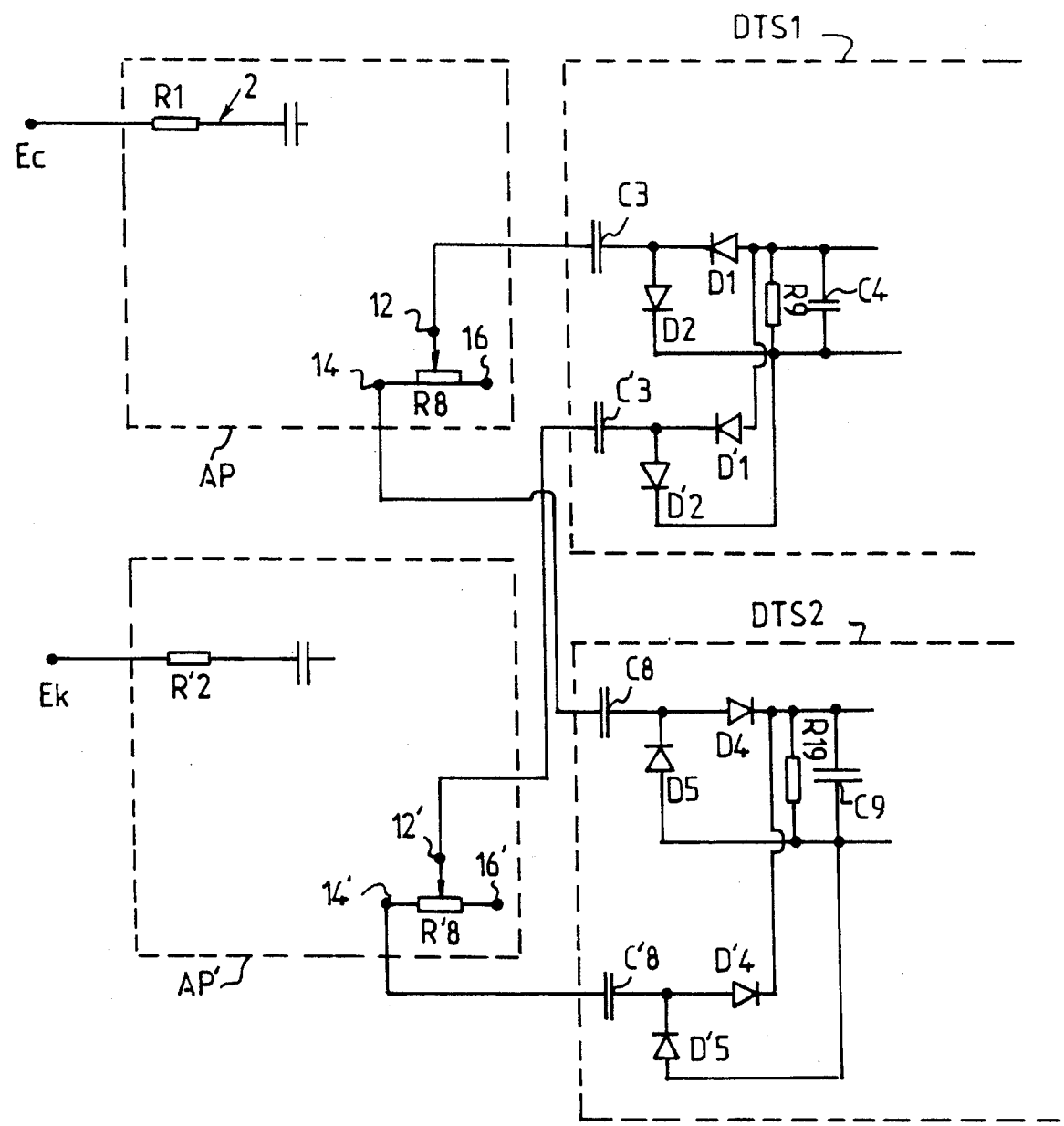
FIG. 3 is an electrical diagram of an alternative embodiment of the converter according to the invention.

As shown in FIG. 3, the solution to this problem consists in a general way of adding an auxiliary amplifier stage AP' similar to the amplifier stage AP and connected to the input EK.

The addition of this auxiliary amplifier stage AP' provides the following modifications with respect to the embodiment described with reference to FIG. 2.

The resistor R2 is removed. The potentiometer R8 no longer acts on the signal applied to the input EC. The auxiliary amplifier stage AP' does not have the resistor R1. The potentiometer R8' only acts on the signal applied to the input EK.

As described with reference to FIG. 2, the diodes D1 and D2 charge the capacitor C4 on the signal applied to the input EC of which a fraction is amplified and taken off by the potentiometer R8.

The auxiliary diodes Di' and D2' arranged in a similar fashion to that of diode D1 and D2 charge the capacitor C4 on the signal applied to the input EK of which a fraction is amplified and taken off by the auxiliary potentiometer R8' similar to the potentiometer R8.

A pair of auxiliary diodes D4' and D5' arranged in a similar way to that of the diode D4 and D5 charge the capacitor C9 independently of the pair of diodes D4 and D5.

It should be noted that the adjustments of the potentiometers R8 and R8' are entirely independent.

Figure 4:
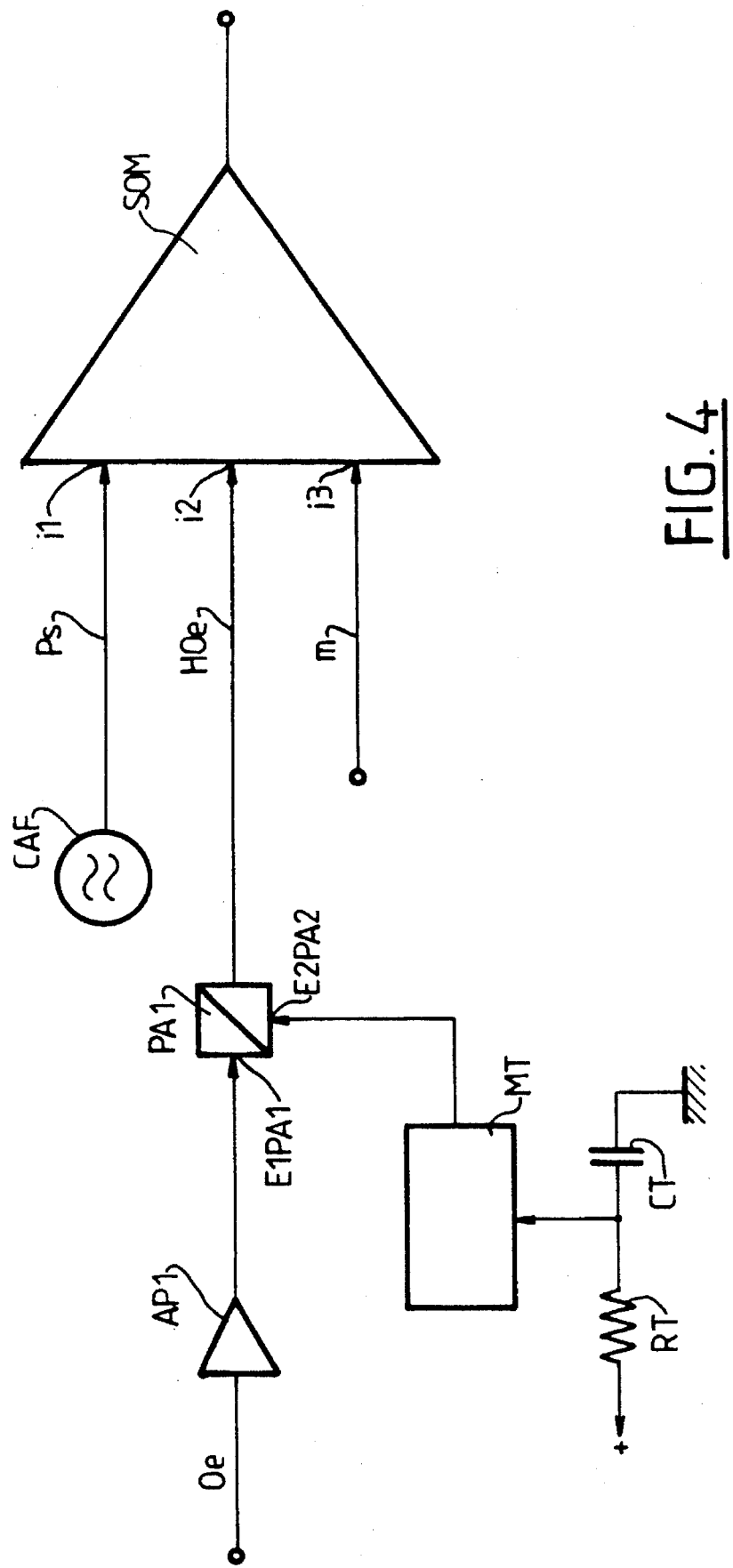
FIG. 4 is a partially detailed electrical diagram of the output switch of the installation according to the invention.

FIG. 4 is now referred to.

During a number of phases of the re-education, the applicant has sought to chop the comprehension of the audio signal in a way to fix the conscious and unconscious attention of the patient on the parametric sound. To achieve this aim, the audio frequency signal may be interrupted with an adjustable reoccurrence of silences of a predetermined duration.

FIG. 4, shows the electrical diagram which allows the audio signal to be chopped according to the predetermined rate with silences of a predetermined duration.

The summator SOM receives at its input 11 a parametric signal PS generated by the parametric converter CAP described with reference to FIG. 2. At its input 12, the summator receives a natural signal HOE interrupted at a predetermined rate with silences of a predetermined duration. More precisely, the natural signal Oe is firstly amplified by an amplifier AP1 then applied to an input E2PA1 of an analogue port PA1 for example of the HEP 4066 N type. The other input ETPA2 which is the opening control of the analogue port PA1, receives a signal coming from a multivibrator MT for example NE 555 which is capable of providing impulses of a predetermined duration. The time constant of the multivibrator MT is determined by an adjustable resistor-capacitor network RT-CT. For example, the time constant is in the order of 0.5s with a resistor RT having a value of 68 kilo-ohms and a capacitor CT having a value of 47 microfarads. The output of the port PA1 provides a signal HOe which is the signal Oe amplified when the input signal E2PA2 is positive and which is zero when the input signal E2PA2 is zero. A signal M representing the modulation due to the microphone of the installation is applied at the input 13 of the summator SOM.

A chronogram of a signal Oe is shown on FIG. 5A. (For the clarity of the illustration, the number of sinusoides of the trace has been greatly reduced compared with what would be shown in practice). A chronogram of the corresponding parametric signal PS is shown on FIG. 5B. This is a substantially sinusoidal signal. The variations in frequency described above can be seen as well as the slower variations of the amplitude.

A chronogram of the natural signal HOe, chopped at a predetermined rate with silences of a predetermined duration is shown on FIG. 5C. The natural signal Oe is thus interrupted with silences at a rate in the order of ¼ Hz, that is to say with a time constant in the order of 0.5s for the time interval defined between time 0 and T2.

Figure 6:
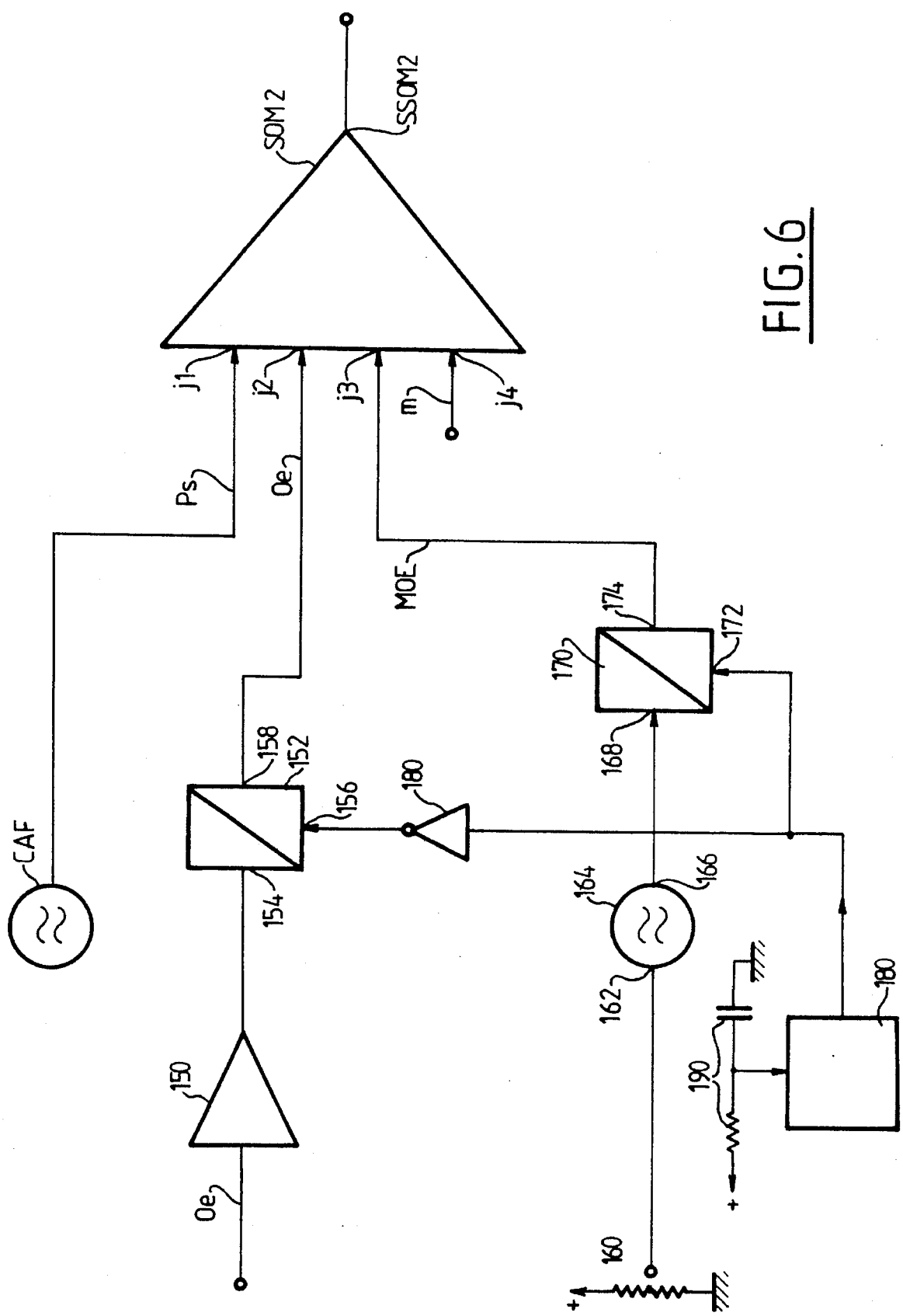
FIG. 6 is a partially detailed electrical diagram of the output switch according to the invention.

FIG. 6 is now referred to which is an electrical diagram of an embodiment of an installation in which the natural signal is masked instead of being chopped as described with reference to FIGS. 4 and 5.

A summator SOM 2 receives at its input j1 the parametric signal PS generated by the parametric converter CAP described with reference to FIG. 2.

The natural signal Oe amplified by an amplifier 150 is applied to the input 154 of an analogue port 152 for example of the HEF 4066 type. The output 158 (HOE) of the analogue port 152 is applied to the input j2 of the summator SOM2.

A voltage which is adjustable due to potentiometer 160 is applied to the input 162 of a voltage controlled oscillator VCO 164. For example, the oscillator 164 is of the HEP 4046 type. The output 166 of the oscillator 164 is applied to the input 168 of an analogue port 170. For example, the analogue port 170 is of the HEF 4066 type. It should be noted that a multi-vibrator 180 controls the analogue ports 152 and 170, one directly and the other 170 after an inverter 180 in such a way that when one is closed, the other is open.

In this way, a natural signal MOe resulting from the oscillator 164 is delivered to the output 174 of the analogue port 170, but only occurs when the input j2 does not receive anything. The signal MOe is then applied to the input j3 of the summator SOM 2. The time constant of the multivibrator 180 is determined by an adjustable RC type network 190.

One input j4 receives a signal M which is representative of the modulation of the microphones.

The parametric signal PS and either the natural signal Oe or the modulated natural signal MOe is thus obtained at the output SSOM2 of the summator SOM2.

The person skilled in the art will understand that such a summator SOM2 may be applied to each ear of the person to be treated.

An installation in accordance with the invention allows a procedure of treatment to be put into operation according to which a mixture of comprehensible sounds chopped or masked as described with reference to FIGS. 3 to 5 and parametric sounds supplied by the installation is injected into each ear of the patient, the ratio of the amplitude of comprehensible sounds and parametric sounds introduced into an ear may be different from the ratio of comprehensible sounds and parametric sounds introduced into the other ear. Each of the ratios is adjustable, independently of the other.

Using these adjustments, the elimination of comprehensible sounds or of parametric sounds may be achieved for each ear.

The practical usage of the installation described with reference to FIGS. 1 to 5 may be carried out as follows, in the case, taken by way of example, of a dyslexic child. The re-education is carried out in five phases stretching out over one to four months with at least two sessions of one hour per week. The evolution of the adjustment of the parametric converter, that is to say of the parametric sound, is indicated below.

In a first phase of re-education, the subject initially hears a signal comprising of "parametric" voice and/or music without the equivalent natural sound.

In the second phase, the patient undergoes a mode known as "alternating". For a same natural base sound (segment of message), he hears alternatively, firstly the sound converted into parametric form (perhaps mixed to a variable degree with the natural sound), then the natural sound on its own. During this alternating phase, the cutting up of the messages (very short phrases) is carried out in a first period by phonemes, in a second period by syllables, in a third period finally by syntax elements.

The third phase of re-education is an active phase as the subject will try to repeat what he hears. The phase starts with a cassette of clear prerecorded words (with intervals allowing the subject to repeat each word or pair of words). The prerecorded words are applied to the audio frequency converter described with reference to FIG. 2. In the same way, the text repeated by the subject is also applied to the audio frequency converter. In the headphones, the subject receives the parametric signal and the natural signal. It can be worth working in stereo, with in principle the parametric signal in the left ear and the natural signal in the right ear, which best corresponds to the functional separation of the brain's hemispheres which is opposite to that of the ears, it being noted that the right hemisphere contains the language centre.

To begin with, the repeating is carried out word by word and then by double word (pair of words).

Thirdly, not only words and double words are treated but also text with syntactic caesura, for example:

"Once upon a time" (sufficient silence to allow for repetition)

"Little Red Riding Hood" (silence for repetition)

This may be done by a mixture of parametric and natural sounds in mono, it being assumed that the words are provided in natural sound.

The fourth stage of re-education progresses to a partially guided mode where, on one hand the subject repeats what he hears and on the other hand he reads what he is repeating. Here, the repeating and the reading are carried out with the help of a prerecorded track, applied to the converter of the invention, and a book in which a text marked with predetermined caesuras corresponding to the silences interrupting the audio frequency signal is written.

The fifth stage is a mixture of guided reading as above, and of free-reading, with pronunciation of the text read, and listening to the text read in the form of a mixture of parametric signal and natural signal. It is at this stage that, progressively, the parametric signal is completely removed.

In some cases (very small children having a smaller attention span) they can be read a whole story in a mixture of parametric and natural sounds. This is worthwhile particularly for stages 1, 2 and 3.

It is of course possible to record what the subject says at any time.

We shall now go back to the technical description of the invention.

In what has been described before, it has been assumed that the oscillator arrangement generates a pure frequency having perhaps a quite significant proportion of harmonics. The applicant has noted that if the harmonic pairs are filtered, the subject hears sounds which are more pleasant. In these conditions the filtration may be obtained by a simple capacitor applied to the output of the converter to act as a low-pass filter as referred to earlier. In another embodiment, the filtration of harmonic pairs is obtained by the generation of a rectangular signal having a form ratio of 0.5. This rectangular signal is produced by the oscillator VCO. In one variation, or in addition, a number of signals may be emitted simultaneously, which can in particular form a musical harmony between them, or cover a narrow band frequency.

It should be remembered that the applicant has noted that by varying in a logarithmic manner the frequency and/or the amplitude of the parametric signal by the frequency and/or amplitude of the natural signal, the subjects experiences a more pleasant sensation and, due to this fact, re-education using such parametric signals produces better results. The applicant has also noted that by varying the time constants of the threshold sensors DTS1 and DTS2, better results in respect of the re-education of the subjects are obtained. Advantageously, the time constants are thus an increasing function of the frequency of the natural signal applied to the said subject.

Advantageously, the texts which are played into the ears of the subjects are recorded on cassettes which have anti-pirating protection.

According to a preferred embodiment, the text is thus recorded in this way using an alternating track system, that is to say that a first part of the text is stored on a first track, whilst a second part of the text is recorded on a second track of the cassette. Each track is provided with a synchronisation signal which allows the play back system to know how to reconstitute the text which has been stored in this way on the two tracks (the simple reading of the sum of the two tracks could be "poisoned" with parasite signals in the non-used parts of the tracks).

As described with reference to FIGS. 3 to 5, the installation may comprise a mixer-summator, which directs an adjustable proportion of the following sounds to the subject's headphones:

a) the original sound of the cassette, b) the corresponding parametric sound, c) the sound resulting from the subject's microphone, d) the corresponding parametric sound, e) the sound from the doctor's microphone, f) the corresponding parametric sound.

It should be noted that two different, independent mixers-summators may be used, one for each of the subject's ears.

In what has been described before, the parametric signal Ps has been adjusted such that in the absence of natural signal Oe, Ps is in the ultra-sound region (and thus inaudible) and Oe causes the frequency of Ps to be lowered such that it enters the audible range.

It is important that in the absence of Oe, the subject does not hear the parametric signal Ps.

Another method to achieve this result is to adjust Ps in the audible range, towards a sharp note, in the absence of Oe, and to ensure that the amplitude of Ps is not zero when Oe is zero.

In order for the amplitude of Ps to be zero, it is sufficient to cancel, for example, the rest voltage at the point 36 of FIG. 2.

In certain limited cases parametry without ultra-sound has shown itself to be more efficient than the parametry firstly described; it can thus be advantageous to use equipment which the user can switch between one or other parametry modes.

The aforegoing description is not, of course, limiting and the functions described may be achieved by any appropriate technical means.

For example, the sound reproduction carrier may not necessarily be an analogue cassette player, but may equally be a digital cassette player or a compact disc player.

In addition, the equipment provides for the training of the audio-phonatory loop of a subject, from a state in which this loop has not been developed, or has been poorly developed. This may of course be used for first learning language; this may equally be used for learning foreign languages.

The invention may also be put into operation based on a microcomputer. By way of output peripheries, the microcomputer is equipped with a monitor, is attached to an audio source player, for example a CD ROM type compact disc player. It is also connected to a high quality speaker, preferably matched with an internal card to improve the audio frequency reproduction, as well as a microphone.

The microcomputer receives a periphery input, which may be a keyboard, or preferably a digitising table which allows the microcomputer to recognise manual writing.

Different types of digitising tables exist which are capable of working in combination with software to recognise personally written graphic characters. Such software now provides for sufficient performance (it being noted that an absolutely perfect response is not necessary in the phase of training).

In a simplified version, the digitising table is equipped with predefined divisions inside which the subject must write capital letters.

Another variant consists of using an optical pencil which co-operates directly with the screen of the monitor to allow this to be written upon.

The functions referred to above of the equipment according to the invention may be achieved separately, or preferably contained on a card in the microcomputer.

The latter embodiment provides the advantage of being able to re-educate not only the audio-phonatry loop, but also the "visual-graphic-actioning" loop, and of doing this at the same time as the audio-phonatory work.

In other words, this achieves not only better training of hearing and speaking, but also of reading and writing.

For example, at the same time as the subject is being trained to recognise the sound "TABLE", then to pronounce the word "TABLE", this same word is displayed in capital letters on the screen of the monitor and the patient must write it on the digitising table, or on another portion of the screen with the aid of the optical pencil.

This opens new horizons for the method proposed according to the present invention.

We claim:

1. An audio frequency converter apparatus for audio-phonatory training of subjects adapted to provide, starting from an audio frequency signal provided at an input, a parametric signal applied, through an intermediatory of an electric acoustic transducer, to a person to be treated, the apparatus comprising:

input amplification means for receiving the audio frequency signal having a frequency and an amplitude and to output an amplified signal at a voltage;

first threshold sensor means, connected to the output of the input amplification means, for subtracting a threshold voltage from the voltage supplied by the input amplification means, after rectification;

second threshold sensor means, connected to the output of the input amplification means, for adding the threshold voltage to the voltage supplied by the input amplification means, after rectification, said second threshold sensor means having a time constant which is at least equal to that of the first threshold sensor means;

voltage controlled oscillator means, connected to the output of the first threshold sensor means, for providing an oscillating output having a frequency that decreases with an increase in said output of said first threshold sensor means;

modulator means, comprising first and second inputs which are respectively connected to the outputs of the second threshold sensor means and the voltage controlled oscillator means, and comprising an output supplying said parametric signal having a frequency oscillating with said frequency of said first input to said modulator means and having an envelope amplitude that increases with an increase in an amplitude of said second input to said modulator means; and variator means for varying at least one characteristic of a first group formed by the envelope amplitude and the frequency of the parametric signal, as a function of at least one characteristic of a second group formed by a logarithm of the amplitude and the frequency of the audio frequency signal.

2. An apparatus in accordance with claim 1 wherein the time constant or constants of the first and second threshold sensors is an increasing function of the frequency of the audio frequency signal.

3. An apparatus in accordance with claim 1 wherein the parametric signal is a compound signal comprising a fundamental frequency and a plurality of harmonic frequencies and in that the modulator means is provided with filter means adapted to filter the said harmonic frequencies.

4. An apparatus in accordance with claim 3, wherein the filter means comprises a low pass type filter connected to the output of the modulator means.

5. An apparatus in accordance with claim 1 wherein the oscillator means generates a square signal having a form factor of the order of 0.5.

6. An apparatus in accordance with claim 1 wherein the audio frequency signal is interrupted at a chosen rate with silences of a predetermined duration.

7. An apparatus in accordance with claim 6, wherein the rate at which the audio frequency signal is chopped is adjustable between 0.3 and 10 Hz.

8. An apparatus in accordance with claim 1 wherein the time constants of the first and second threshold sensor means are adjustable such that the larger time constant remains below a predetermined value which is representative of a rythmical sequence which takes into account the phonemes comprising the audio frequency signal.

9. An apparatus in accordance with claim 1 wherein the input amplification means comprises two amplification stages each one of which is, separately and independently, adapted to amplify a respective audio frequency signal.

10. An apparatus in accordance with claim 1 wherein the amplitude of the parametric signal is zero during the silences of the natural signal.

11. An apparatus in accordance with claim 1, wherein said variator means comprises at least one diode and resistor network associated with at least one of the first and second threshold means.

12. An audio frequency converter for audio-phonatory training of subjects, comprising:

input amplification means for receiving an audio frequency signal having a first frequency and a first amplitude, the input amplification means amplifying the audio frequency signal and outputting an amplified signal at an amplified voltage as a result thereof;

rectification means for rectifying the amplified signal and outputting a rectified signal as a result thereof;

first threshold sensor means, connected to the rectification means, for subtracting a threshold voltage from the rectified signal and for outputting a first threshold signal as a result thereof;

second threshold sensor means, connected to the rectification means, for adding the threshold voltage to the rectified signal and for outputting a second threshold signal as a result thereof;

voltage controlled oscillator means, connected to the output of the first threshold sensor means, for providing an oscillating output having a frequency that decreases with an increase in the output of the first threshold sensor means;

modulator means, comprising first and second inputs which are respectively connected to the outputs of the second threshold sensor means and the voltage controlled oscillator means, and comprising an output supplying a parametric signal having a frequency oscillating with the frequency of the first input to the modulator means and having an envelope amplitude that increases with an increase of an amplitude in the second input to the modulator means; and varying means for varying at least one characteristic of a first group formed by the envelope amplitude and the frequency of the parametric signal as a function of at least one characteristic of a second group formed by a logarithm of the amplitude and the frequency of the audio frequency signal.

13. An apparatus in accordance with claim 12, wherein the first threshold means includes first and second resistors and a first, second and third capacitor, wherein a combination of the first and second resistor and the first, second and third capacitors results in first through fourth filters respectively having first through fourth time constants (Q0, Q1, Q2 and Q3), wherein the second threshold means includes a third and fourth resistor and a fourth, fifth and sixth capacitor, wherein a combination of the third and fourth resistors and the fourth, fifth and sixth capacitors results in fifth through eighth filters respectively having the first through fourth time constants Q0, Q1, Q2 and Q3, and the first through fourth time constants have relative values with respect to each other such that the envelope amplitude and the frequency of the parametric signal varies in accordance with the logarithm of the amplitude of the audio frequency signal.

14. An apparatus in accordance with claim 13, wherein the envelope frequency (Fs) of the parametric signal varies according to the frequency (Fe) of the audio frequency signal by:

$$Fs = (1 - Q1 * Fe)(Q2 + Q0 + Q3) Ae,$$

wherein Ae is the amplitude of the audio frequency signal.

* * * * *